May 21, 1962

United States Patent Office 3,050,502
Patented Aug. 21, 1962

3,050,502
DIAZO CONDENSATION POLYMERS
Ibert Mellan, Bayside, N.Y., assignor to Polychrome Corporation, Yonkers, N.Y., a corporation of New York
No Drawing. Filed Jan. 29, 1959, Ser. No. 789,782
5 Claims. (Cl. 260—72.5)

The instant invention relates to an improved method for the preparation of high molecular weight diazo compounds. More particularly the instant invention relates to a procedure for the preparation of high molecular weight photosensitive diazo compounds and to the novel compounds formed thereby. Such compounds have found particular utility in pre-sensitized lithographing plates.

In some diazo reproduction processes, diazonium compounds of high molecular weight are desirable or necessary. For example, it has been found that the photo decomposition products of certain high molecular weight diazo compounds are necessary in the conversion of selected natural or synthetic materials of colloidal nature from hydrophilic water soluble materials to water repellent form. Thus, in a lithographing plate a hydrophilic coating thereon is treated with a light sensitive diazo compound and exposed to ultra-violet light through a negative thereby rendering the exposed portions hydrophilic and ink receptive.

It has been suggested to prepare such high molecular weight diazo compounds by condensation of relatively low molecular weight diazonium compounds with aldehydes and/or ketones. As is well known in the art, aromatic hydrocarbons and certain derivatives thereof which include the diazonium compounds, react with carbonyl compounds, notably formaldehyde, to form a wide variety of high molecular weight products. Initially the aromatic hydrocarbon reacts with one moleculare of formaldehyde to form a methylol derivative. The last then condenses with a second molecule of the aromatic with the elimination of water to form a methylene bridge when the aromatic hydrocarbon possesses two or more reactive hydrogens. Theoretically such an aromatic material can condense with an equi-molar quantity of formaldehyde to produce condensation polymers of extremely high molecular weight. As recognized by the art, the diazonium compounds and formaldehyde will condense in accordance with the above mechanism to give high molecular weight polmers. However, since the diazonium compounds are more or less thermally unstable, low temperatures must be employed for the condensation, necessitating refrigeration to maintain the reacting mixture at below about 10° C. for the extended period of time the condensation reaction requires. Considering that the diazonium compounds are also quite light sensitive, the requirement for refrigeration further complicates processing conditions and adds sharply to the expense of the ultimate product.

The principal object of the instant invention is to provide an improved process for the preparation of diazo condensation polymers.

A further object of the instant invention is to provide a novel diazo condensation polymer.

Other objects and the advantages of the instant invention will become apparent in the description which follows.

The diazo condensation polymers of the instant invention are formed according to the following formula sequence:

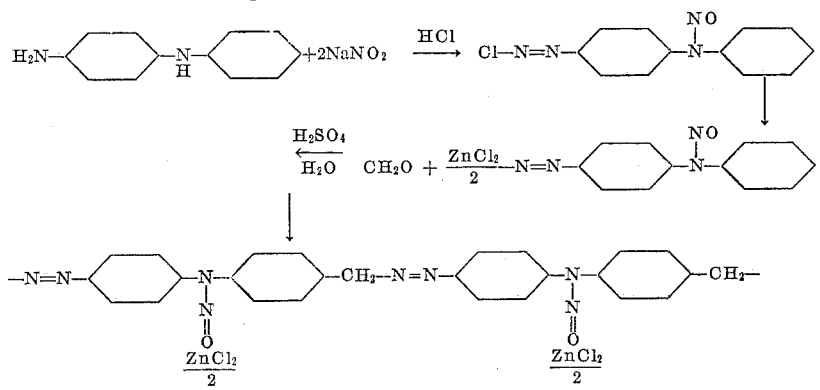

The first step in the process is to convert para-amino diphenyl amine to the double salt of zinc chloride para diazo nitroso diphenyl by reaction with sodium nitrite in a sulfuric or hydrochloric acid medium (nitrous acid). This reaction is effected at temperatures below about 10° C., and the reactant solution should be protected from light. Thereafter the diazo nitroso compound is salted out of solution as the zinc chloride salt.

By and large conventional diazotization temperature and acidic conditions and overall techniques are employed for forming the diazo nitroso compound. However, since the nitroso derivative is desired, the nitrite should be used in a 2:1 molar ratio relative to the para amino diphenyl amine.

The unusual stability of this diazo nitroso derivative permits the subsequent condensation with formaldehyde and re-arrangement shown by the above formula sequence to occur in the range of ambient temperature to about 70° C., a relatively elevated temperature for this type of condensation.

The actual condensation and rearrangement is effected in a moderately concentrated sulfuric acid medium (density in the range of about 1.4–1.6) with a 1:1 mol ratio of formaldehyde to diazo compound. The formaldehyde may suitably be in the form of paraformaldehyde, trioxane or formalin, or other water soluble aldehydes, generally those containing not more than 3 carbon atoms.

The condensation product which is precipitated out of solution by the addition of salt and zinc chloride has a high degree of thermal stability yet retains the light sensitivity desired indiazo compounds, particularly as they may be used in connection with presensitized metal lithographing plates, e.g. see copending application Serial No. 408,291, owned by applicant's assignee.

For further understanding of the invention the following examples are presented.

EXAMPLE I

Add 14.8 grams of para amino diphenylamine to 1,000 cc. of water containing 32 cc. of concentrated hydrochloric acid (35%–37% HCl). Heat to about 70° C. and hold at this temperature until all the para amino diphenylamine is dissolved. Cool the resulting solution to 3° C.–5° C. From this point on, the solutions and the synthesis must be protected from light.

The next step in the process is to dissolve 12 grams of sodium nitrite in 50 cc. of cold water at 5° C. and add this to the solution of para amino diphenylamine hydrochloride, all at once, and stir constantly for 10–15 minutes. Filter the resulting solution and begin to salt out the para diazo nitroso diphenyl as soon as possible.

Add 100 grams of salt (NaCl) to the filtrate with constant stirring, then add 100 cc. of a solution containing 10 grams of zinc chloride, and finally add about 200 grams of salt, in small quantities, or enough salt to complete the precipitation.

The precipitate is removed by filtration and then washed free of both hydrochloric acid and the slight excess of nitrous acid with a saturated solution of sodium chloride containing 5 percent of zinc chloride. To obtain this compound in a dry form, drain as much liquid as possible from the filter cake and dry the compound under vacuum, carefully protected from light. The moist paste is now ready for the second phase of the synthesis.

*Condensation and Rearrangement*

Disperse the moist filter cake in 90 cc. of cold water. Add 150 cc. of concentrated sulfuric acid (66° Bé.) in 5 cc. portions, and stir constantly. Care must be taken not to permit the temperature to rise above 70° C. Should the temperature rise above 70° C., then stop adding the acid until the temperature drops down below 70° C. When all the acid has been used, add 3 grams of trioxymethylene, and permit the mixture to stand at room temperature of 4 to 5 hours.

Slowly pour this mixture on 1,000 grams of ice. Stir until the ice melts; dilute with water to 2,000 cc.; and filter. To the filtrate add 100 grams of sodium chloride and 100 cc. of 10 percent zinc chloride solution, then add more sodium chloride until precipitation is complete. Remove the precipitate by filtration and wash with saturated sodium chloride solution containing 5 percent of zinc chloride w./v., drain and dry under vacuum in a dark chamber.

Another method of condensation is as follows:

Slowly add 100 cc. of concentrated sulfuric acid (66° Bé.) to 90 cc. of cold water. Cool the resulting solution to 70° C. Add small amounts of the para diazo nitroso diphenyl filter cake to the hot sulfuric acid solution and stir constantly. Care must be taken not to allow the reaction to become too violent or to allow the temperature to go above 70° C. When half of the filter cake is added and the solution begins to thicken, add an additional 50 cc. of sulfuric acid (66° Bé.) in 2–5 cc. portions. The temperature is not permitted to rise above 70° C. Continue to add small pieces of the filter cake until it is all consumed. Add 3 grams of trioxy-methylene. Permit the reaction mixture to remain for 4 to 5 hours, then slowly pour this mixture upon 1,000 grams of ice, and stir. When the ice has melted, dilute this solution to 2,000 cc. Permit the solution to stand for several hours in order to make certain that solution is complete; then filter. To the filtrate add 100 grams of salt, 100 cc. of 10 percent zinc chloride solution (w./v.) and finally enough sodium chloride to complete precipitation, all with constant stirring. Filter and wash the precipitate with saturated sodium chloride solution containing 5 percent of zinc chloride (w./v.). Dry in a dark place under vacuum.

In order to prepare a dry product, free of impurities, the following procedure has been developed. About 300 grams of wet filter cake are suspended in 1,000 cc. of methyl alcohol, filtered, and the residue is again suspended in 1,000 cc. of methyl alcohol. The purified product is then removed by filtration, air dried, and stored in a dry place protected from light.

In the foregoing, this invention has been described only in connection with preferred embodiments thereof. Many variations and modifications of the principles of the present invention within the scope of the description herein are obvious. Accordingly, it is preferred to be bound not by the specific disclosure herein, but only by the appending claims.

I claim:

1. A condensation process which comprises contacting the double zinc chloride salt of para diazo nitroso diphenyl with formaldehyde in admixture with sulfuric acid and at a temperature in the range of about ambient temperature to 70° C.; and thereafter recovering the condensation product from the sulfuric acid solution.

2. The process of claim 1 in which the condensation product is dried and purified by contacting same with methyl alcohol, filtered and dried.

3. A process for preparing high molecular weight light sensitive materials which comprises diazotizing para amino diphenylamine by contact with at least two moles of sodium nitrite in an acid medium whereby para diazo nitroso diphenyl is formed; precipitating out the zinc chloride salt of the para diazo nitroso diphenyl; thereafter dissolving the salt in sulfuric acid and contacting same with a water-soluble aldehyde having not more than 3 carbon atoms at a temperature in the range of ambient temperature to about 70° C.; and recovering the resulting condensation product from the sulfuric acid solution.

4. A process for preparing high molecular weight light sensitive materials which comprises diazotizing para amino diphenylamine by contact with at least two moles of sodium nitrite in an acid medium whereby para diazo nitroso diphenyl is formed; precipitating out the zinc chloride salt of the para diazo nitroso diphenyl; thereafter dissolving the salt in sulfuric acid and contacting same with about one mole of formaldehyde at a temperature in the range of ambient temperature to about 70° C.; and recovering the resulting condensation product from the sulfuric acid solution.

5. The process of claim 4 wherein the sulfuric acid solution employed for dissolving the zinc chloride salt has a density of about 1.4–1.6.

References Cited in the file of this patent

UNITED STATES PATENTS 2,679,498     Seven et al.             May 25, 1954

OTHER REFERENCES

Degering: "An Outline of Organic Nitrogen Compounds," University Lithoprints, Michigan, 1950, p. 302.